United States Patent [19]

Leal et al.

[11] Patent Number: 5,087,597
[45] Date of Patent: Feb. 11, 1992

[54] CARBON DIOXIDE ADSORBENT AND METHOD FOR PRODUCING THE ADSORBENT

[75] Inventors: Orlando Leal; Carmelo Bolivar; Gonzalo Sepúlveda; Gregorio Molleja, all of Caracas; Germán Martínez, Carabobo; León Esparragoza, Caracas, all of Venezuela

[73] Assignees: Armada de la Republica de Venezuela, San Bernardino; Universidad Central de Venezuela, Caracas, both of Venezuela

[21] Appl. No.: 554,551

[22] Filed: Jul. 19, 1990

[51] Int. Cl.⁵ .................. B01J 20/10; B01J 20/12; B01J 20/22
[52] U.S. Cl. .................. 502/62; 502/80; 502/84; 502/401; 502/405; 502/407
[58] Field of Search .................. 55/68; 502/62, 401, 502/405, 407, 411, 84, 80; 423/230

[56] References Cited

U.S. PATENT DOCUMENTS

| | | | |
|---|---|---|---|
| 2,818,323 | 12/1957 | Haensel | 423/230 X |
| 3,505,785 | 6/1967 | Kirkland | 55/67 |
| 3,658,696 | 4/1972 | Shively et al. | 502/62 X |
| 3,722,181 | 3/1973 | Kirkland et al. | 502/401 X |
| 3,892,678 | 7/1975 | Halasz et al. | 502/401 |
| 3,935,294 | 1/1976 | Teller | 423/230 X |
| 3,984,349 | 10/1976 | Meiller et al. | 502/401 |
| 4,121,946 | 10/1978 | Chuiko et al. | 502/401 X |
| 4,340,496 | 7/1982 | Abbott | 210/656 X |
| 4,828,695 | 5/1989 | Yamamura et al. | 502/401 X |
| 4,999,175 | 3/1991 | Vansant et al. | 423/230 X |

OTHER PUBLICATIONS

Kirk-Othmer, *Encyclopedia of Chemical Technology*, 3rd Ed., vol. 6, pp. 207–214 (1979).
Leal et al., "Reversible Adsorption of Oxygen on Silica Gel", J. Amer. Chem. Soc., 97:18, pp. 5125–5129 (10-3-75).
Burwell et al., "Modified Silica Gels as Adsorbents as Selective Adsorbents for Sulphur Dioxide", J.C.S. Chem. Comm., 1974, pp. 342 and 343.
Burwell, "Modified Silica Gels as Adsorbents and Catalysts", Chem. Tech., Jun. 1974, pp. 370–377.

Primary Examiner—W. J. Shine
Assistant Examiner—Douglas J. McGinty
Attorney, Agent, or Firm—Bachman & LaPointe

[57] ABSTRACT

A reversible adsorbent for carbon dioxide, which can be used as a decontaminant of closed environments, has been devised. It consists of a novel material formed by a surface modified silica gel with active sites for the chemisorption of $CO_2$ at room temperature combined with a clay which acts as an agglomerant in a preferred weight ratio of 80/20. The carbon dioxide is liberated under heating at 110° C. The surface area of the material ranges between about 120 and about 240 $m^2/g$ with a total pore volume between about 0.4 and about 0.8 cc/g where about 80% of the total pore volume contains pores of a diameter between about 60 Å and about 180 Å. The material is capable of adsorbing between about 7.5 and 11.7 cc of dry $CO_2$ per gram and can be regenerated between about 70° and about 150° C. without losing any adsorptive capacity. Dry carbon dioxide is chemisorbed as a surface ammonium carbamate which becomes a surface bicarbonate in the presence of water.

39 Claims, 5 Drawing Sheets

CARBON DIOXIDE ADSORBENT AND METHOD FOR PRODUCING THE ADSORBENT

BACKGROUND OF THE INVENTION

The present invention relates to a reversible adsorbent for carbon dioxide which can be used as a decontaminant of closed environments and a method for producing the adsorbent.

It has been known for some time that modified silica gels could be used as adsorbents and catalysts. In his article "Modified Silica Gels As Adsorbents and Catalysts," *Chemical Technology*, Vol. 4, No. 6, June 1974, pp 370–377, Professor Robert L. Burwell, Jr. discusses the use of modified silica gels as adsorbents. Professor Burwell reports that studies have been conducted on the adsorption of $CO_2$, $H_2S$ and $SO_2$ by modified silica gels. The test work involved passing a helium carrier gas through a bed of modified silica gel that is first activated at about 175° C. to remove adsorbed water; injecting a sample of $CO_2$, $H_2S$ or $SO_2$; and releasing the adsorbed material by temperature programmed desorption at a rate of about 30° per minute. Professor Burwell also reports that aminomodified gels have been used to trap carbon dioxide during tests to measure the amount of carbon dioxide in a particular environment.

In the article "Modified Silica Gels as Selective Adsorbents for Sulphur Dioxide," *Journal of the Chemical Society Chemical Communications*, 1974, pp 342–3, Professor Burwell and Mr. Orlando Leal briefly note that silica gel, chemically modified by conversion into—$CH_2$—$CH_2CH_2NH_2$, where o represents a silicon atom at the surface of the silica gel, selectively adsorbs carbon dioxide. The adsorbed gas is liberated by temperature programmed desorption at about 100° C. The article continues on to discuss a modified silica gel which adsorbs sulphur dioxide.

In the article "Reversible Adsorption of Oxygen on Silica Gel Modified by Imidazole—Attached Iron Tetraphenylporphyrin" by Orlando Leal et al., *Journal of the American Chemical Society*, Vol 97, pp 5125–5129, the authors describe the adsorption of oxygen on an iron (II) porphyrin attached to the imidazole groups of a silica gel containing 3-imidazolylpropyl groups bonded to surface atoms of silicon.

None of these articles however teach or suggest how to produce a commercially viable absorbent capable of diminishing the ambient concentration of carbon dioxide in open or closed environments.

Accordingly, it is an object of the present invention to provide a novel reversible adsorbent which can be used to diminish the ambient concentration in open or closed environments.

It is a further object of the present invention to provide an adsorbent as above which can be used to concentrate or scrub carbon dioxide out of gas streams where it is present as a contaminant.

It is yet a further object of the present invention to provide an adsorbent which is regenerable under rather moderate heating conditions.

It is still a further object of the present invention to provide a process for forming the above adsorbent.

These and other objects and advantages will become more apparent from the following description and drawings in which like reference numerals depict like elements.

SUMMARY OF THE INVENTION

The present invention resides in a novel reversible adsorbent based on a chemically surface-modified silica gel for the adsorption of carbon dioxide. The adsorbent can be utilized to diminish the ambient concentration of carbon dioxide in either open or closed environments. It has particular utility in closed environments such as those which exist in submarines, amphibious vehicles and spacecraft. The adsorbent can also be used to concentrate or scrub carbon dioxide out of other gas streams such as oxygen, carbon monoxide or olefin streams where carbon dioxide could be present as a contaminant.

The adsorbent comprises a surface modified silica gel having a chemical composition consisting essentially of from about 65 to about 85 wt. % $SiO_2$, from about 8 to about 20 wt. % $Al_2O_3$, from about 0.7 to about 1.8 wt. % $Fe_2O_3$, from about 5.8 to about 14.3 wt. % organic residues and from about 0.2 to about 1.2 wt. % trace impurities and a surface modified by aminoorganic residues chemically bonded in an amount between about 0.50 and about 1.26 mmoles per gram. The adsorbent shows near infrared bands at 7220, 6720, 6557, 5970–5480, 5270, 4945, and 4545 $cm^{-1}$. It is further characterized by: a surface area between about 170 and about 240 $m^2/g$; a total pore volume between about 0.4 cc/g and about 0.9 cc/g with about 80% of the total pore volume containing pores having a diameter between about 60 Å and about 180 Å; the presence of about 2-3 molecules of amino modifying reagent per square nanometer; and a heat of adsorption of $CO_2$ between about 7 and about 17 Kcal/mol. It has been found that the adsorbent of the present invention adsorbs between about 7.5 and about 11.7 cc of dry $CO_2$ per gram and is regenerable at temperatures between about 70° C. and about 150° C. without losing substantially any adsorptive capacity.

The novel adsorbent of the present is generated by the chemical surface modification of silica gel which has been mixed with a filler material such as natural clay. A polyalcoxisilane with one or more amino ($NH_2$) groups in its molecules is used as the surface modifying agent.

The method of producing the adsorbent broadly comprises the steps of: providing a silica gel; providing a clay material; mixing the silica gel with the clay material to obtain a material containing between about 10 wt. % and about 30 wt. % of clay; controlling the water content of the silica gel-clay material between about 35 wt. % and about 50 wt. %; extruding said silica gel-clay material; treating the extruded material in a solution containing a surface modifying reagent; washing the surface modified material in a solvent; and drying the washed material. Further details of the method will be brought out in the following detailed description.

DETAILED DESCRIPTION

As previously pointed out, the present invention resides in a novel reversible adsorbent based on a chemically surface-modified silica gel for the adsorption of $CO_2$ and a method for producing the adsorbent.

The novel adsorbent is generated by chemical surface modification of an inorganic silica gel polymer which possesses the following chemical composition: from about 96 to about 99.7 wt. % $SiO_2$, from about 0.05 to about 0.15 wt. % $Al_2O_3$, from about 0.01 to about 0.03 wt. % $TiO_2$, from about 0.005 to about 0.015 wt. % $Fe_2O_3$, from about 0.06 to about 0.08 wt. % CaO, from about 0.05 to about 0.07 wt. % $Na_2O$, from about 0.02 to about 0.04 wt. % $ZrO_2$ and from about 0.02 to about 0.04 wt. % trace elements. As will be seen in the following discussion, a polyalcoxisilane with one or more amino ($NH_2$) groups in its molecules is used as a modifying agent for the surface of the solid matrix. It is believed that the presence of the amino group(s) in the modifying molecule agent is the guarantee to assure carbon dioxide adsorption.

A clay material such as a natural clay having a composition consisting essentially of from about 3.0 to about 10 wt. % $Fe_2O_3$, from about 40 to about 75 wt. % $SiO_2$, from about 10 to about 25 wt. % $Al_2O_3$, from about 0.1 to about 0.8 wt. % MgO, from about 0.3 to about 2.6 wt. % $K_2O$ and from about 0.1 to about 1.5 wt. % $Na_2O$ is used as a filling binder. It is mixed with the silica gel in a ratio between about 10 and about 50 wt. % of clay and about 90 and about 50 wt. % of silica gel, preferably in a ratio of silica gel weight: clay weight between 90:10 and 70:30, and most preferably, in an 80:20 ratio of silica gel: clay. The clay serves as an agglomerant.

The preparation of the adsorbent of the present invention involves grinding and milling of silica gel to a particle size between about 40 to about 200 mesh, preferably between about 60 to about 80 mesh, and grinding and milling (triturating) the clay to a particle size between about 20 and about 400 mesh, preferably between about 60 and about 80 mesh. The preparation can be carried out either with the silica gel solely or with silica gel-clay mixture described in the previous paragraph.

In order to obtain an adequate material for a subsequent extrusion process, the humidity of the solid matrix should between about 35 and about 50 wt. % water content, preferably between about 42 and about 48 wt. %, to obtain the plasticity necessary for extrusion. Control of the water content is achieved by adding sufficient water to the silica gel-clay mixture to obtain the desired humidity level.

Extrusion of the moist silica gel-clay material may be carried out using any suitable conventional extrusion device known in the art such as a BONOT type extrusion device which is a single screw extrusion machine. The extruded particles may have any desired shape, i.e. cylinders, pellets, spheres, etc.

After extrusion, the extruded material should be dried at temperatures ranging between about 27° C. and about 270° C., preferably between about 100° C. and about 250° C., for a time interval between about one and about four hours, preferably between about two and about three hours. This results in an intermediate product having a chemical composition consisting essentially of from about 76 wt. % to about 92 wt. % $SiO_2$, from about 7 wt. % to about 20 wt. % $Al_2O_3$, from about 0.6 wt. % to about 2.0 wt. % $Fe_2O_3$ and the balance essentially impurity materials.

Figure 1:
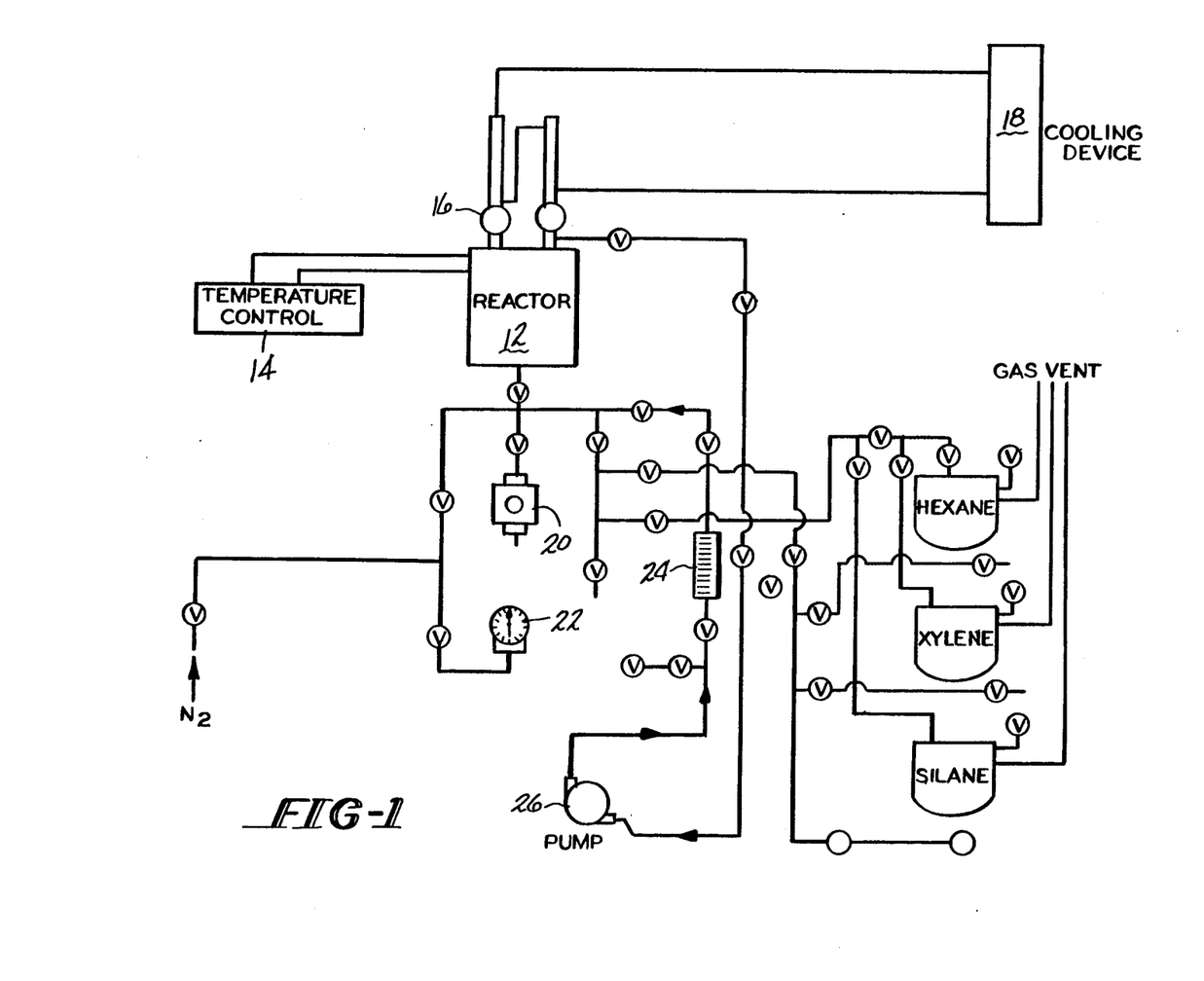
FIG. 1 is a schematic diagram of a pilot plant for preparation of the adsorbent of the present invention.

The surface chemical modification of the silica gel can be carried out using the pilot plant shown in FIG. 1. The pilot plant includes a charge reactor 12 with continuous circulation having a 50 liter total charge capacity, a temperature control 14 for the reactor, a condensor 16, a cooling device 18, a canister 20 for collecting the surface modified adsorbent, a pressure gauge 22 for monitoring pressure, a rotameter 24 for monitoring liquid velocity and a pump 26.

The modification reaction is carried out in the reactor 12 in the following manner. The extruded material in an amount between about 5 and about 25 kg preferably between about 10 and about 20 kg, is transferred to the reactor 12. Between about 1.2 and about 15.0 liters of the modifying agent, preferably between about 1.5 and about 12.0 liters, is added to the reactor 12 by transferring the modifying agent from storage tanks via conduits using pressure on the top of the liquid as the driving force. The modifying agent(s) may comprise one or more aminoalkoxysilanes of different characteristics such as 3-aminopropyltriethoxysilane, N-2-Aminoethyl-3aminopropyltrimethoxysilane and N-Methyl-3-aminopropyltrimethoxysilane. The structural formulas of the above-named silanes are as follows:

a) 3-aminopropyltriethoxysilane or γ-Aminopropyltriethoxysilane b) N-2-Aminoethyl-3 aminopropyltrimethoxy silane c) N-methyl-3 aminopropyl trimethoxysilane The liquid phase concentration of the silane material should be between about 5 vol. % and about 75 vol. %, preferably between about 13 vol. % and about 38 vol. %.

To this mixture, a volume of a solvent is added. Between about 5 and about 25 liters, preferably between about 10 and about 20 liters, is transferred into the reactor 12 via suitable conduits. The solvent concentration should be between about 25 vol. %, and about 95 vol. %, preferably between 62 vol. % and 87 vol. %. The solvent may be an aromatic hydrocarbon selected from the group consisting of benzene, toluene, o-, m-, p- xylenes, and mixtures thereof.

The modification reaction may be carried out at a temperature between about 50° and about 150° C., preferably between about 80° and about 110° C., for a period of about 4.5 to about 30.0 hours, preferably between about 8 and about 12 hours. During the modification reaction, the extrudate and the modifying reagent—solvent solution should be agitated. Agitation may be carried out by creation of a stirring effect using bubbling pure deoxygenated nitrogen or recirculation of the liquid phase which creates a stirring effect equal to from about 60 to about 200 rpms, preferably between about 80 to about 120 rpms. It has been found that agitation in this manner is equivalent to a mechanical agitation with a marine propeller stirrer. When the pure deoxygenated nitrogen is utilized for stirring, it may be supplied from a source to the reactor via appropriate conduits at a volume space velocity (VHSV) of between about 0.18 to about 0.80 reciprocal hours ($h^{-1}$), preferably between about 0.30 and about 0.50 $h^{-1}$.

Once the modification reaction is terminated, the solid material thus obtained should be washed in the reactor with successive charges of a solvent. The solvent may be selected from the group consisting of liquid alkanes and aromatic hydrocarbons. If the solvent is a liquid alkane, it may be one selected from the group consisting of n-pentane, n-hexane, n-heptane and mixtures thereof. If the solvent is an aromatic hydrocarbon, it may be one selected from the group consisting of benzene, toluene, o-, m-, p-xylenes and mixtures thereof.

The solvent is added to the reactor via suitable conduits at a volume between about 5 and 25 liters, perferably between about 10 and about 20 liters. The amount of solvent to modified solid material in the reactor is from about 1 liter of solvent per kilogram of material to about 5 liters of solvent per kilogram of material. Washing may be effected by 2 to 6 charges of solvent, preferably between 2 to 4 charges. Washing should be carried out at a temperature between about 25° C. and about 100° C., preferably between about 30° C. and about 80° C., for about 0.3 to about 3 hours, preferably between about 0.5 to about 2.0 hours. Deoxygenated nitrogen may be passed through the reactor at a constant flow rate of about 60 to about 200 cc per minute, preferably between about 80 to about 100 cc per minute to prevent oxidation of the surface organic residue, at the working temperature.

Drying of the surface modified material may be carried out in a two stage operation. In the first stage, drying is carried out in situ by means of a continuous flow of deoxygenated, pure and dry nitrogen, at a space velocity (VHSV) between about 0.18 to about 0.60 $h^{-1}$, preferably between about 0.20 to about 0.30 $h^{-1}$ for about 20 to about 48 hours, preferably between about 24 and about 30 hours, keeping a drying temperature between about 50° to about 80° C., preferably between about 60° to about 70° C.

Prior to the second drying stage, the surface modified solid material may be transferred, under an air-free nitrogen stream, into conventional containers 20 used in the air regeneration systems of the type U-209 submarine, which have a capacity of between 1.6 to 2.4 kilograms of adsorbent material each. By doing this, premature carbon dioxide adsorption may be avoided.

The second drying stage comprises placing the containers or canisters containing the adsorbent inside an oven where the second drying operation may take place in vacuo at a temperature between about 80° and about 140° C., preferably between about 100° C. and about 110° C., at pressures ranging between about 0.1 and about 10 millimeters of mercury (Hg), preferably between about 1 and about 5 mm of Hg, for periods between about 1 hour and about 6 hours, preferably between about 1 hour and about 3 hours. This second stage of drying helps eliminate any remaining solvent trapped in the pores after the first drying stage and enhances the adsortive capacity of the solid surface modified adsorbent material.

Since the canisters containing the adsorbent materials are preferably tightly sealed in an air-free nitrogen atmosphere, they are ready to be used in air regeneration systems of submarines and other closed environments.

It has been found that the adsorbent material of the present invention has the following physical and chemical properties. The surface area is between about 170 and about 240 $m^2/g$, preferably between 200 and 220 $m^2/g$; the total pore volume is between about 0.4 and about 0.9 cc/g with about 80% of the total pore volume containing pores with a diameter between about 60 A and about 180 A; and with a chemical composition comprising 65 to 85 wt. % $SiO_2$, preferably 70 to 80 wt. % $SiO_2$, 8 to 20 wt. % $Al_2O_3$, preferably 10 to 15 wt. % $Al_2O_3$, 0.7 to 1.8 wt. % $Fe_2O_3$, preferably 1.0 to 1.5 wt. % $Fe_2O_3$, 0.05 to 0.4 $TiO_2$, preferably 0.1 to 0.3 $TiO_2$, 0.05 to 0.3 CaO, preferably 0.1 to 0.2 CaO, 0.1 to 0.5 MgO, preferably 0.2 to 0.4 MgO, 3 to 9 wt. % carbon as an organic residue, preferably 5 to 7 wt. % carbon, 1.0 to 3.0 Nitrogen as an organic residue, preferably 1.5 to 2.5 wt. % Nitrogen, and 1.8 to 2.3 wt. % Chlorine as an inorganic residue, preferably 2.0 to 2.1 wt. % Chlorine.

Infrared spectra of the chemically surface unmodified and modified material as well, were recorded in the near infrared region of the spectra between 1200 and 2100 nanometers. Samples were dried at 160° C. and then dumped into a cuvette containing carbon tetrachloride which had been previously dried with anhydrous $K_2CO_3$. Samples were allowed to stand until air had been displaced from the pores of the gels. A cuvette with silica gel in carbon tetrachloride was used as a reference in the case of the surface-modified materials. The cuvettes used had one centimeter lightpath and were made of fused silica. Spectra were recorded in an UV-visible-NIR Spectrophotometer Cary 17D.

Figure 2:
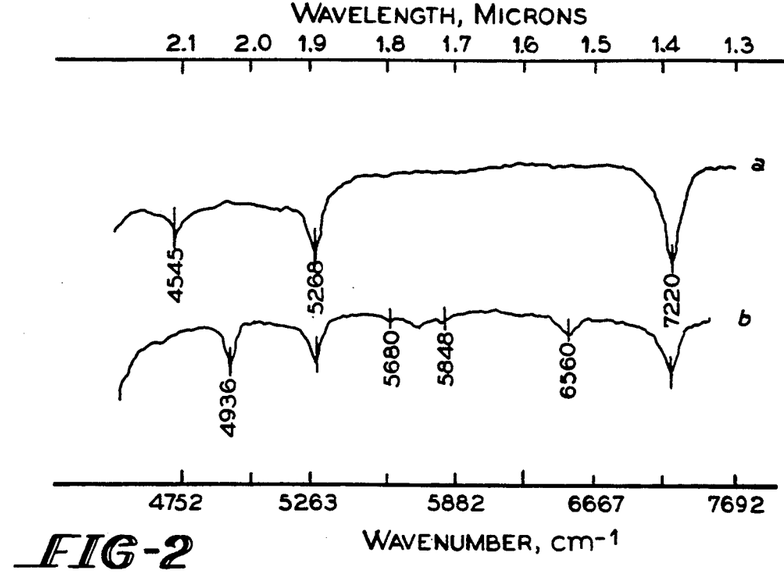
FIG. 2 is a graph showing the near infrared spectra of (a) surface unmodified material, and (b) a surface modified adsorbent.

Silica gel alone, dried at 150° C. for 15 minutes showed bands at 7220, 5270 and 4545 reciprocal centimeters ($cm^{-1}$). Under modification, a reduction of the area of these bands ocurred and that was accompanied by the appearance of new bands which are summarized in TABLE I with their assignments. The spectra are shown in FIG. 2.

TABLE I

NEAR INFRARED FREQUENCIES ($cm^{-1}$) AND ASSIGNMENTS IN PURE AND MODIFIED SILICA GEL

| FREQUENCY ±5 $cm^{-1}$ | ASSIGNMENT |
|---|---|
| 7220 (s) | First overtone of symmetrical stretching O—H |
| 6720 (sh) | First overtone of asymmetrical stretching N—H |
| 6557 (s) | First overtone of symmetrical stretching N—H |
| 5680–5970 (w) | Manifold of bands: First overtone of the stretching of C—H in methyl and methylene |

TABLE I-continued

NEAR INFRARED FREQUENCIES (cm$^{-1}$) AND ASSIGNMENTS IN PURE AND MODIFIED SILICA GEL

| FREQUENCY ±5 cm$^{-1}$ | ASSIGNMENT |
|---|---|
| | groups. |
| 5270 (s) | Adsorbed water: interacted O—H groups |
| 4945 (s) | Combination band N—H group. |
| 4545 (m) | Combination band O—H group. |

Key: s: strong; m: medium; w: weak; sh: shoulder

These results are without doubt conclusive proof that organic residues carrying amino groups are chemically bonded to the surface of the solid matrix, resembling the hairs of a toothbrush.

Carbon, nitrogen and hydrogen content was determined in an F & M, C, N & H Analyzer model 185 C. An estimate of the number of surface-bonded groups per gram of gel can be made from these results.

The nitrogen content of aminopropyl surface modified gel (APG) varied between 0.97 and 1.26 mmoles of N/g when the condensation reactions was carried out between 4 and 30 hours. The average content is 1.18±0.09 moles of N/g.

Figure 3:
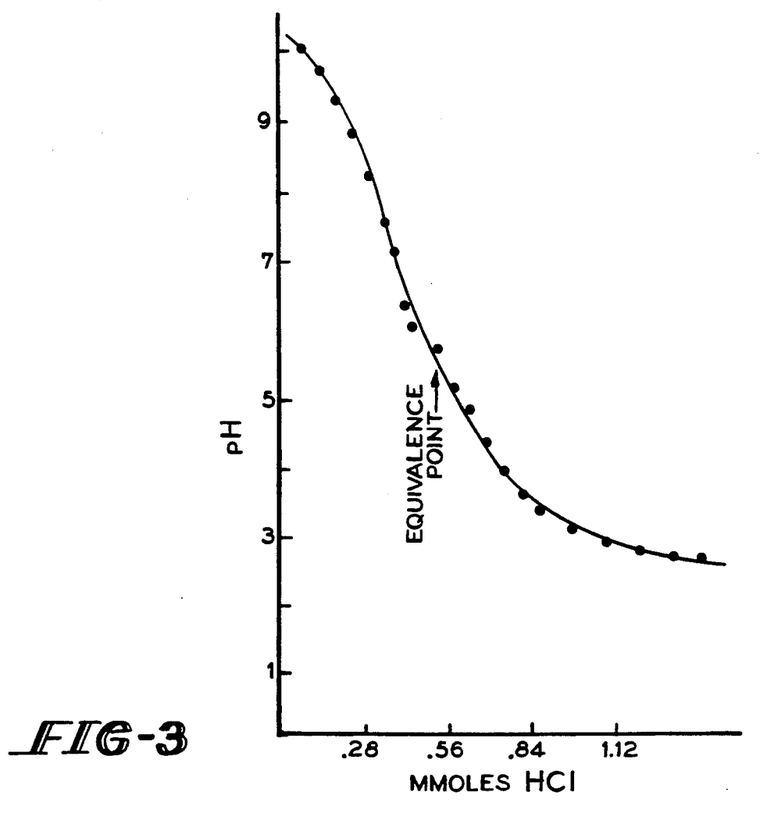
FIG. 3 is a graph with the potentiometric titration curve of the surface-amino groups of a gel, containing 0.50 $NH_2$ groups per gram of adsorbent, with a 0.0557N aqueous solution of HCl.

A shortening of the reaction time to 2 hours decreased it to 0.74 mmoles of Nitrogen. APG showed degrees of modification varying between 2.00 and 2.80 molecules of aminopropyl groups/nm$^2$. A reduction of the degree of modification ocurred when the condensation reaction was run for 1.5 hours. These results were confirmed by a potentiometric titration of the aminopropil groups present on the the surface of APG. A sample of the adsorbent of 1.0011 gram was added to 50 ml of distilled water and titrated with a standard aqueous solution of 0.0557N HCl. Small volumes of this solution, between 0.5-1.00 cc, was gradually added to the stirred solution and the pH recorded subsequently. FIG. 3 shows the curve obtained by plotting pH versus mmoles of HCl solution added. The equivalence point lies around 0.50±0.06 mmoles of HCl or between 8 and 10 ml of HCl solution.

Thus the sample contained 0.50 of —NH$_2$ per gram of gel in good agreement with 0.57 mmoles of Nitrogen/g obtained by microanalysis in this gel which was the result of running the reaction for 1.5 hours.

Figure 4:
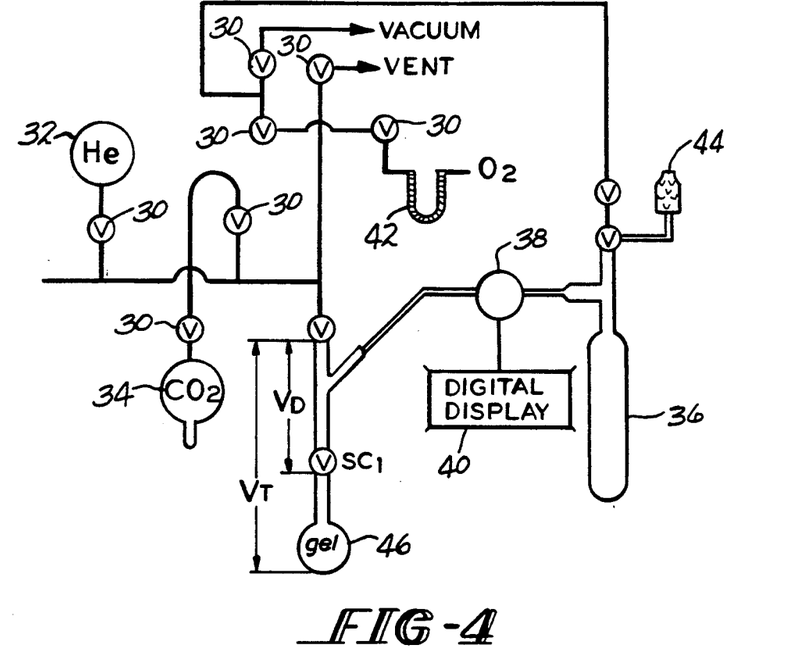
FIG. 4 is a schematic diagram of the glass apparatus for measuring the adsorption isotherms of carbon dioxide over the adsorbent of the present invention.

The gas-solid adsorption isotherm measurements were performed on the apparatus shown in FIG. 4. It consists basically of a high vacuum system built out of pryrex glass and equipped with greaseless stopcocks 30. Oil and mercury diffusion pumps, Leybold - Heraus model PD 30L, were used to reach pressures as low as 10$^{-6}$ torr. The gases used for adsorption studies were introduced from different inlets. Purified Helium, used to establish a blank, was kept in a permanent bulb 32 and carbon dioxide from a high purity tank was kept in a removable bulb 34. To perform measurements, dry air at atmospheric pressure was admitted into the reference cell 36.

Any pressure in $V_D$ or $V_T$ was measured with respect to the pressure of the reference cell. The difference between the reference and the working cells were measured by a Kistler servo pressure sensor 38, which measured ±1 atmospheres relative to the reference cell. A digital display 40 was connected to the sensor 38.

The test apparatus further included a dry ice trap 42 which is employed to eliminate $CO_2$ when oxygen is used as the adsorptive. A calcium chloride trap 44 was provided to dry the air fed to the reference cell.

The gas to be adsorbed was admitted to $V_D$ and the pressure measured. Then valve $SC_1$ was opened and the gas expanded into $V_T$ and once again the pressure was measured. The first gas to be measured was Helium, which was assumed to be not adsorbed. After that, the helium was pumped off and the gas to be adsorbed (carbon dioxide in this case) was introduced into $V_D$. The pressure drop between the helium and the carbon dioxide consecutive runs was the gas adsorbed. The pressure drop was then converted into cubic centimeters at standard temperature and pressure (STP CC) of gas adsorbed by the expression:

Volume of gas adsorbed (STP)=$\Delta \times (1/$Gauge Atm  (1)

Pressure)$\times (P_{room}/P_o°)\times (T_o°/T_{room})\times V_D$ where $$\Delta = \Sigma(P_D - P_T) - (V_T H_e/V_D H_e)(P_T H_e - P_{Tgas}); \quad (2)$$

$(P_D - P_T)$ was obtained from the gas adsorbed and $$(V_T H_e/V_D H_e) = (P_D - P_{T'}/P_T - P_{T'}), \quad (3)$$

where $P_D$=Doser pressure, $P_T$=Total volume pressure and $P_{T'}$=previous $P_T$.

Figure 5:
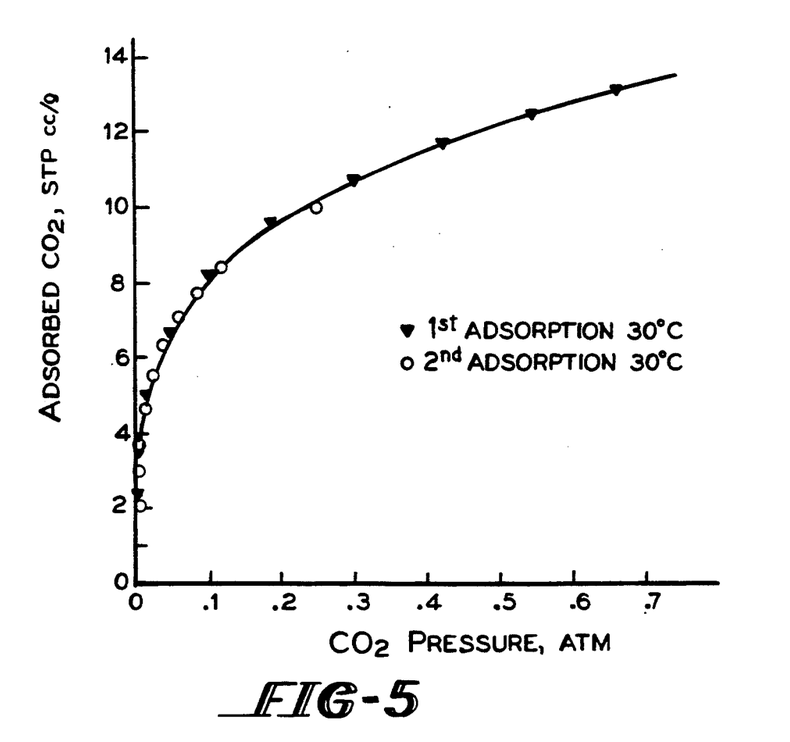
FIG. 5 is a graph demonstrating the regenerability of the process through an adsorption isotherm at 30° C.
Figure 6:
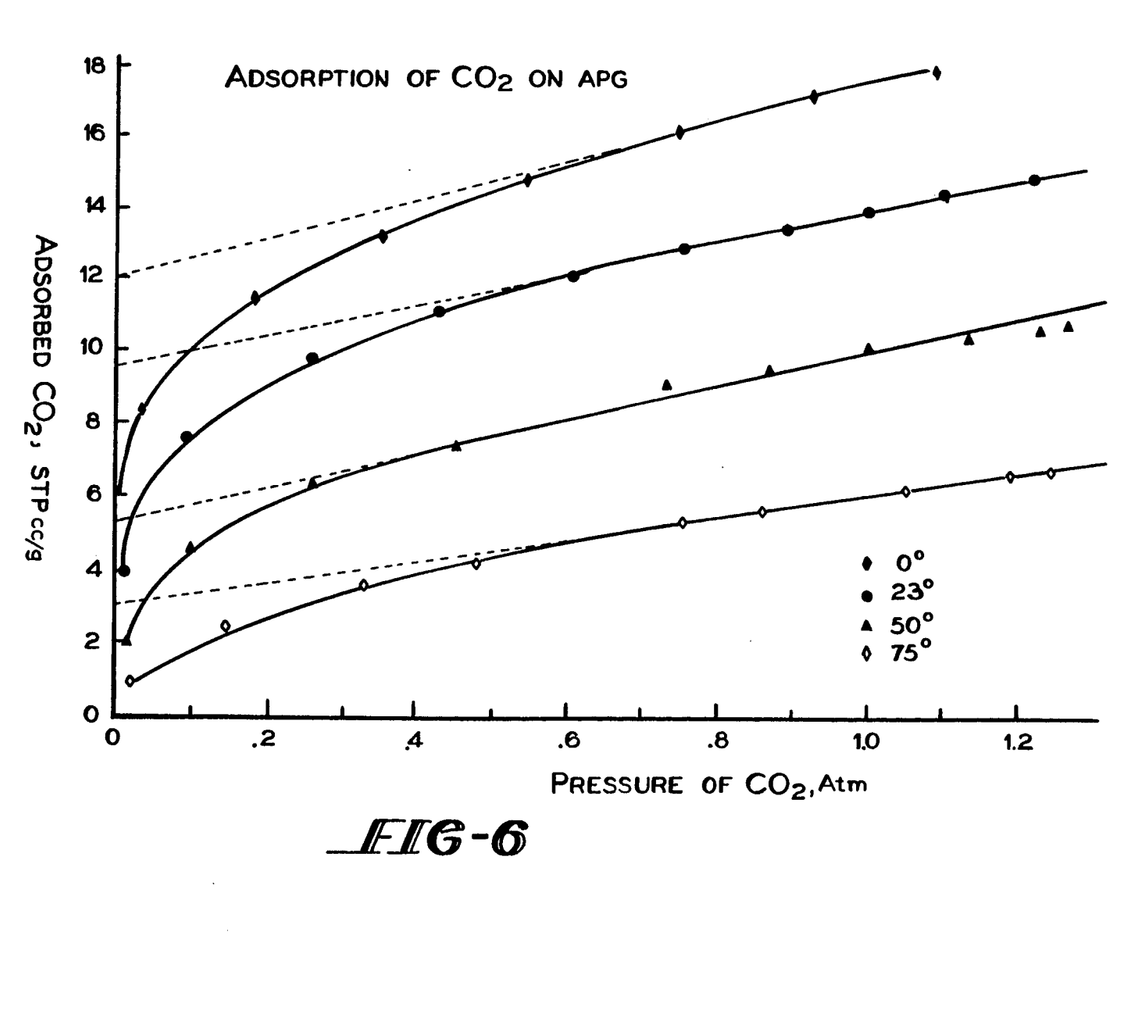
FIG. 6 is a graph showing the adsorption isotherms of carbon dioxide over the adsorbent of the present invention at different temperatures.

To study the adsorption, the gel was placed in the bulb 46 of the apparatus and evacuated overnight at 100° C. to remove any residual water and then heated to 160° C. for one hour to activate it. That the gel adsorbs carbon dioxide reversibly was confirmed by running two consecutive activation-adsorption-activation cycles on this gel. Adsorption was carried out at 30° C. The results are shown in FIG. 5. Temperatures were measured with a chromel-alumel thermocouple (Omega Inc.) by means of a Hewlett Packard recorder model 713A. A temperature programmer was employed to control the temperature of the adsorbent. Isotherms were determined at different temperatures. They are presented in FIG. 6.

At higher temperatures, a greater pressure was required for adsorption of a particular volume of carbon dioxide. The heat of adsorption,

H, could be determined by ln $P_2/P_1 = -\Delta H/R$ $(1/T_2 - 1/T_1)$

Figure 7:
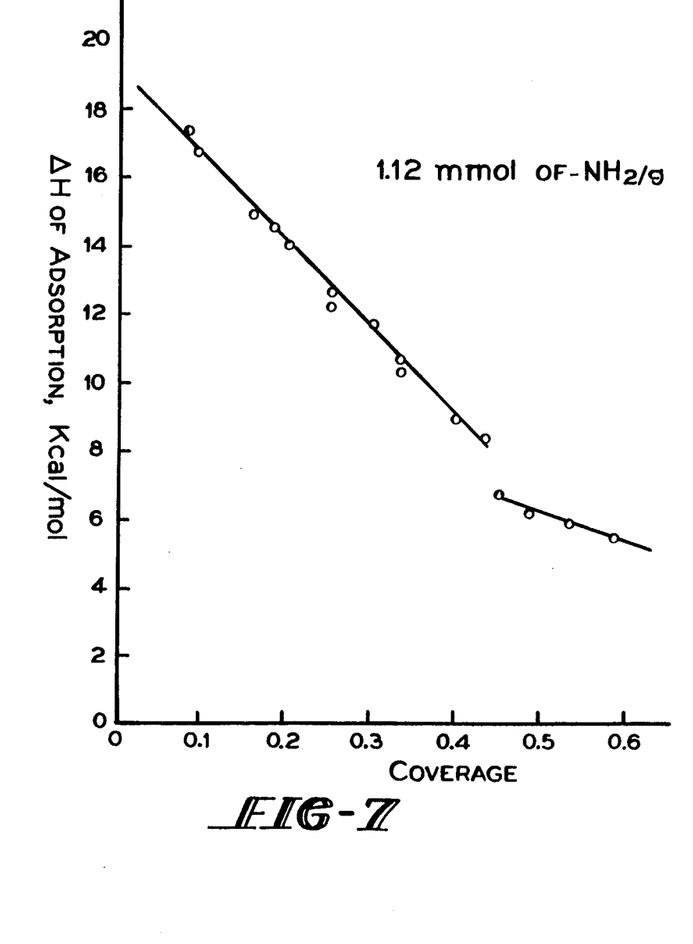
FIG. 7 is a graph displaying the variation of the heat of adsorption of the process as the coverage increases.

FIG. 7 shows that H decreases as the amount of $CO_2$ adsorbed increases. The break on the line around 0.5 of coverage corresponds to a change from chemical to physical adsorption and indicates that the adsorption process is due to the formation of a carbamate species on the modified surface of the material, where two amino groups from it are used up per each carbon dioxide molecule adsorbed, as indicated by the following:

In the presence of water, or when the carbon dioxide is wet, the capacity of the material towards the adsorption of carbon dioxide is duplicated due to a surface chemical transformation of the carbamate into two adsorbed bicarbonate molecules.

The heat of adsorption of dry carbon dioxide by the adsorbent is between about 7.0 and about 17.0 kilocalories per mol, preferably between about 13.0 and about 15.0 kcal/mol. If each dry carbon dioxide molecule reacts with two nitrogen atoms on the gel, then a gel surface containing 1.12 mmoles of Nitrogen per gram should adsorb 12.5 STP cc of $CO_2$. The value found experimentally was 12.0 STP cc of $CO_2$ (FIG. 6) which indeed is strikingly close and confirms our statement.

The adsorbent can be manufactured in the form of extrudates of a size of between about 1/32 and about ⅛ inch, in spheres or tablets of variable size, preferably in the form of extrudates of a size of between about 1/16 and about ⅛ inch in diameter, and between about 5 and about 12 millimeters in length using a mixture of a modified silica gel and a natural clay in the weight ratio between 90:10 and 70:30, preferably in the weight ratio of 80:20. To obtain a material with the desired plasticity to be extrudated, between about 35 and about 50 wt. % of water is added, preferably between about 42 and about 48 wt. %. The obtained material has useful texture and surface properties but not identical to those of the modified silica gel. It can act as a reversible adsorbent for carbon dioxide.

An advantage of the adsorbent of the present invention over prior art adsorbents is its regenerability under rather moderate heating conditions.

In the laboratory, adsorbent material produced in accordance with the present invention was regenerated 35 times in a flow system by programmed temperature desorption. The fact that the material can be reused makes it highly attractive as a carbon dioxide scrubber for streams of gases in petrochemical processes and a low cost adsorbent for closed ambients and environments such as these found in submarines and spacecraft.

In order to determine the effectiveness of the present adsorbent of the present invention for removal of carbon dioxide from atmospheres containing between 0.1 and 2.0 volume % of carbon dioxide, preferably between 1.0 and 1.5 volume %, canisters containing the adsorbent were tested during navigation in a type U-209 submarine of the Venezuelan Navy for period of between 36 and 48 hours carrying a crew of between 40 and 44 members. The ship sailed 100 meters deep.

The effectiveness of the present invention may be illustrated by the following examples.

EXAMPLE 1

Adsorbents were prepared from a modified silica gel with no added clay using a method similar to that described above. Adsorbent 1, named ADSUB-1 was prepared from silica gel Davison grade 62 with a particle size ranging between 60–80 mesh, an average pore diameter of 160 Angstroms and an organosilane using meta-xylene as the solvent. The chemical composition of the silica gel is as follows:

TABLE II

| CHEMICAL ANALYSIS OF SILICA GEL | |
|---|---|
| ELEMENT | WEIGHT % |
| Silicon as $SiO_2$ | 99.68 |
| Iron as $Fe_2O_3$ | 0.01 |
| Aluminum as $Al_2O_3$ | 0.10 |
| Titanium as $TiO_2$ | 0.02 |
| Calcium as CaO | 0.07 |
| Sodium as $Na_2O$ | 0.06 |
| Zirconium as $ZrO_2$ | 0.03 |
| Trace Elements | 0.03 |

The physical properties of the silica gel are as follows:

TABLE III

| PHYSICAL PROPERTIES OF SILICA GEL DAVISON GRADE 62 | |
|---|---|
| BET Surface area ($m^2/g$) | 340 |
| Pore Volume (cc/g) | 1.15 |
| Average Pore Diameter (Å) | 140 |
| Actual Density (g/cc) | 2.19 |
| Apparent Density (g/cc) | 0.40 |

In a 250 ml round bottom flask, ten grams of silica gel was placed and dried by refluxing in meta-xylene for one hour using a Dean-Stark trap.

Once this procedure was completed, 4.5 grams of 3-Aminopropyltrietoxisilane was added and it was refluxed at 136° C. with a continuous bubbling of dry deoxygenated nitrogen for 24 hours. Then it was cooled down to room temperature and the sobrenatant was decanted. The obtained material was rinsed three times with 100 ml portions of n-hexane and dried in vacuo, 25 mm Hg, at 100° C. for two hours.

This material, named ADSUB-1, was analyzed by Near Infrared Spectrophotometry (NIR) in a Varian model 17D Spectrophotometer in the frequency region with 4761 and 11110 reciprocal centimeter.

The sample was located in a fused silica cell of one centimeter lightpath, embedded in carbon tetrachloride, which had been dried on anhydrous $K_2CO_3$. The spectra of unmodified silica gel and ADSUB-1 were recorded and they are shown in FIG. 2, (a) and (b) respectively.

ADSUB-1 has a surface modification which produces a Nitrogen/Carbon ratio of between 2.48 and 3.16 determined by C, N, H microanalysis. This corresponds to a degree of modification of 2.33 and 2.62 —$CH_2$ $CH_2$ $CH_2$ $NH_2$ groups per square nanometer of adsorbent surface. The total adsorbent surface is between 270 and 320 $m^2/g$.

The test of the adsortive capacity of this adsorbent towards carbon dioxide was carried out in an continuous flow experimental system, using ultrapure helium as carrier gas. Successive volumes of $CO_2$ were introduced onto the adsorbent by means of a gas injection valve with a 0.65 cc volume loop which was injected every injection-lap.

The adsorbent was placed in a pyrex U tube of 6 mm outer diameter and connected to the carrier flow in the oven of a Hewlett Packard model 5710A Gas Chromatograph. One gram of adsorbent was employed and successive volumes of $CO_2$ were injected at room temperature (27° C.) until saturation of the adsorbent. Then, by programmed temperature desorption (PTD) between 27° and 150° C. at a heating rate of 10° C./min and with helium flow rate of 30 cc/mm., the adsorbed carbon dioxide was released and measured to determine the adsortive capacity of the material ADSUB-1. This is presented in Table IV.

TABLE IV
ADSORTIVE CAPACITY OF ADSUB-1

| ADSORTIVE | ADSORBED VOLUME* (cc/g) |
|---|---|
| DRY $CO_2$ | 9.10 ± 0.05 |
| Water saturated $CO_2$ | 20.80 ± 0.05 |

*Helium flow rate = 30 cc/min.

The addition of a saturated cupric sulfate aqueous solution to the material resulted in a material with a surface complex between $Cu^{2+}$ ions and the surface amino groups of the adsorbent. This yields a material unable to adsorb carbon dioxide, lost due to the complexing of the amino groups by the $Cu^{2+}$ ion. This is a clear demonstration that the amino groups are the responsible sites for the carbon dioxide adsorption.

A second adsorbent (ADSUB-2) was prepared by mixing 24 kilograms of the Davison grade 62 silica gel with 6 kilograms of natural clay. The clay had a particle size of 60-80 mesh.

The chemical analysis and physical properties of the natural clay are a follows:

TABLE V

| ELEMENT | WEIGHT % |
|---|---|
| CHEMICAL ANALYSIS OF NATURAL CLAY | |
| Silicon as $SiO_2$ | 70.50 |
| Iron as $Fe_2O_3$ | 7.00 |
| Aluminum as $Al_2O_3$ | 19.50 |
| Sodium as $Na_2O$ | 1.00 |
| Potassium as $K_2O$ | 1.50 |
| Magnesium as MgO | 0.50 |
| PHYSICAL PROPERTIES OF NATURAL CLAY | |
| BET Surface Area (m$^2$/g) | 20 |
| Pore Volume (cc/g) | 0.16 |
| Average Pore Diameter (Å) | 190 |
| Actual Density (g/cc) | 2.86 |
| Apparent Density (g/cc) | 1.90 |
| Bed Strength (Kg/cm$^2$) | 9.00 |

13.8 kilograms of water was added to the silica gel-clay mixture. The material was then extrudated and dried as described in Example II herein. It was then modified with 15 kilograms of 3-Aminopropyltrietoxisilane and washed and dryed as in Example II.

The chemical and physical properties of the resulting adsorbent are as follows:

TABLE VI
CHEMICAL COMPOSITION OF FINAL PRODUCT (ADSUB-2)

| ELEMENT | WEIGHT % |
|---|---|
| Silicon as $SiO_2$ | 74.20 |
| Iron as $Fe_2O_3$ | 1.26 |
| Aluminum as $Al_2O_3$ | 12.70 |
| Titanium as $TiO_2$ | 0.23 |
| Calcium as CaO | 0.15 |
| Magnesium as MgO | 0.36 |
| Carbon (as organic residue) | 6.35* |
| Nitrogen (as organic residue) | 1.92* |
| Chlorine (as organic residue) | 2.05* |

*Determined by XPS.

The analysis of the sample was carried out by two complementary techniques: atomic absorption and XPS. With the last one we determined the % C and % N bonded to the surface as an organic residue

SURFACE CHEMICAL COMPOSITION OF FINAL PRODUCT (ADSUB-2)

Besides the preferred physical and chemical properties set forth above, the catalyst gives XPS (X-Ray photoelectric spectroscopy) signals. This technique consists of exciting the atoms of any material with X-Rays and measuring the energy spectrum of the electrons emitted by photoemission. The investigations were carried out with Leybold-Heraus XPS apparatus equipped with a HP-1000 computer, which consists of a X-ray source, an energy analyzer, and a detection system. The apparatus was equipped with a magnesium cathode (hV=1253.6 eV). $C_{1S}$ (285.9 eV) and $Al_{2S}$ (74.2 eV) were taken as reference for calculating the binding energies. The intensities of the peaks were referred to the total area of $C_{1S}$ band. Sensitivity factors for each element were used to correct the area bands.

TABLE VII
SURFACE CHEMICAL COMPOSITION OF FINAL PRODUCT (ADSUB-2)

| ELEMENT N° | SPECIFICATION | ATOMIC % |
|---|---|---|
| 1 | O 1s | 47.98 |
| 2 | N 1s | 2.78 |
| 3 | C 1s | 10.70 |
| 4 | Cl 2p | 1.17 |
| 5 | Si 2p | 35.56 |
| 6 | Al 2s | 1.74 |
| 7 | Fe 2p | 0.04 |

FT-IR STUDY OF SURFACE OF THE FINAL PRODUCT (ADSUB-2)

Samples of the silica gel matrix, natural clay and the adsorbent (final product) were pressed as disks, FT-IR Spectra were recorded in FT-IR Perkin Elmer 1750 Spectrometer. After substraction of the bands related to silica gel and clay the following bands were obtained:

TABLE VIII
FT-IR FREQUENCIES OF FINAL PRODUCT (ADSUB-2)

| FREQUENCY (CM$^{-1}$) | ASSIGNMENT |
|---|---|
| 3430–3000 | Stretching N—H ($\gamma$-NH$_2$) |
| 2936 | Stretching C—H ($\gamma$-CH$_2$) |
| 1630 | Deformation mode NH($\delta$-NH$_3$+) |
| 1559 | Deformation mode (carbamate) |
| 1490 | Deformation mode (bicarbonate) |

That indicates the surface of the final product is modified with —$CH_2CH_2CH_2NH_2$ groups and there is formation of both carbamate and bicarbonate species due to the interaction carbon dioxide-surface amine group. Experiments were carried out without avoiding exposure to atmospheric carbon dioxide.

TABLE IX
PHYSICAL PROPERTIES OF THE FINAL PRODUCT (ADSUB-2)

| BET Surface Area (m$_2$/g) | 210 |
|---|---|
| Pore Volume (cc/g) | 0.66 |
| Average Pore Diameter (Å) | 110 |
| Actual Density (g/cc) | 2.54 |
| Bed Strength (Kg/cm$^2$) | 7.73 |

EXAMPLE II

To achieve the preparation of the adsorbent in different morphologies: extrudated cylinders, pellets, spheres, etc., a mixture of silica gel-natural clay was prepared in a ratio 80:20 wt. %. The clay chemical composition is given in TABLE V. Water was added to the mixture to reach 46 wt. % of humidity to match the plasticity needed to assure the extrudating process. Extrudates of cylindrical shape of 2.8 mm of diameter and length ranging between 5.3 and 9.2 mm with a length: diameter ratio of 2.4 were formed. These were dried at 240° C. for 2.4 hours. Fifteen kilograms of this material was modified in the continuous recirculating charge reactor of the pilot plant shown in FIG. 1 with a fixed bubbling of dry nitrogen throughout the reactor at a VHSH of 0.40 h$^{-1}$.

A 3-Aminopropyltriextoxisilane modifying silane was mixed with the extruded material in a 1:2 wt. % ratio to assure complete modification of the surface. Fifteen liters of meta-xylene per charge was used as the solvent. The temperature of the reactor was set at 104° C. and the reaction took place for 10 hours. Afterwards the liquid was drained out and the solid was rinsed twice with n-hexane at 65° C. for two hours. Following that, the material was dried in two stages: firstly, in a nitrogen stream flowing at VHSH of 0.40 h$^{-1}$ at 170° C. for 30 hours and secondly in a drying procedure in vacuo between 1 and 20 mm. of Hg, at 120° C. for 3 hours, in order to eliminate the solvent remaining inside of the pores of the material and to avoid a premature adsorption of $CO_2$.

Once the material was dried in an inert atmosphere, it was loaded directly from the pilot plant into receptacles (canister) with a capacity to contain between 1.8 and 2.0 kilograms of adsorbent. This loading procedure was carried out with a countercurrent of dry and pure nitrogen flowing throughout the system. Finally the canisters were hermetically sealed keeping a positive pressure of nitrogen inside the containers. Eighteen different charges of material were prepared, whose adsorption capacities towards carbon dioxide are shown in TABLE X. The adsorptive capacity of the different batches prepared ranged between 7.5 and 19.9 cubic centimeter of $CO_2$ per gram of adsorbent, with an average value of 9.8 cc/g, which corresponds to a capacity of 20 liters of dry $CO_2$ and 40 liters of wet $CO_2$ per canister. In submarines and closed environments with living beings inside, the environment is saturated with water.

TABLE X
ADSORTIVE CAPACITY OF ADSORBENT MATERIAL ADSUB-2 OF DIFFERENT PREPARATION BATCHES

| CHARGE NUMBER | ADSORTIVE CAPACITY (cc $CO_2$/g) |
|---|---|
| 1 | 7.5 |
| 2 | 9.8 |
| 3 | 10.8 |
| 4 | 9.8 |
| 5 | 10.8 |
| 6 | 19.9 |
| 7 | 7.5 |
| 8 | 9.1 |
| 9 | 11.7 |
| 10 | 9.2 |

Average = 9.8 + 2.2 cc $CO_2$/g

EXAMPLE III

Figure 8:
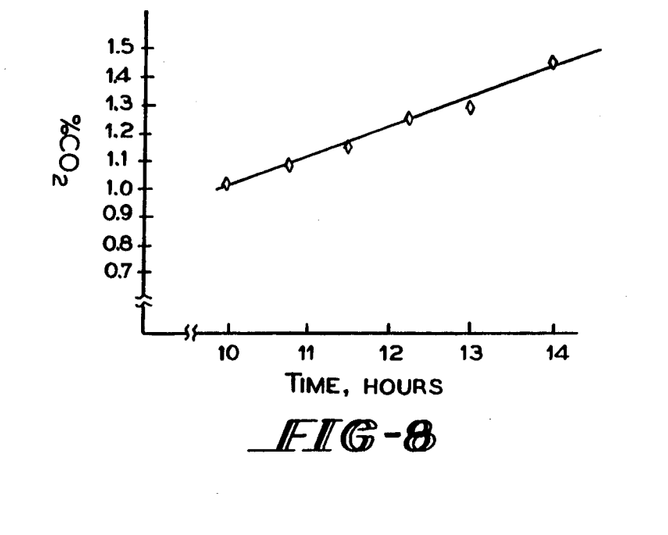
FIG. 8 is a graph showing the change with time of the carbon dioxide concentration inside of a submarine type U-209 sailing continuously at a depth of 50 meters for 15 hours.

Twenty four canisters containing the adsorbent were brought into a conventional type U-209 submarine, along with the analytical equipment to monitor carbon dioxide, oxygen and nitrogen local concentrations. In this case, a Gas Chromatograph was used. The quality of the air was evaluated for a period between thirty six and forty eight hours in different steps. During the first ten hours, the air regenerating system of the submarine was turned off and the composition of the air was monitored every fifteen minutes using an Alltech CTR Chromatographic column. The concentration of carbon dioxide in the closed ambient of the submarine increased from 0.1 vol. % to 1.0 vol. % at a rate of 0.1 vol. % per hour with of crew of 43 men, as it is shown in FIG. 8.

After this period was consumed, the air regenerating system was turned on with the adsorbent of the present invention incorporated therein. The adsorbent kept the rate of increase of carbon dioxide at 0.1 vol. % per hour and the physiologically dangerous carbon dioxide level of 1.5 vol. % was reached after four extra hours of immersion.

In later experiments of demonstration 36 canisters were used and they were tested for an immersion period of 40 hours.

EXAMPLE IV

The adsorbent filters previously described were regenerated in a vacuum oven by evacuating to 10 mm Hg at 120° C. six different and consecutive times after they were reused in immersion conditions in the submarine. The capacity towards the carbon dioxide showed no change. It remained as 40 liters of wet $CO_2$ per canister. In the regeneration process under the previously mentioned conditions, between 17 and 20 cc of a liquid was collected out of the filter at 0° C. This corresponds mainly to water liberated by the crew.

EXAMPLE V

A Venezuelan Navy frogman in a force task operation dived between 10 and 50 minutes at three meter depth using a diving Auto respiratory Oxygen device, containing between 1.5 and 2.5 kilograms of the adsorbent of the present invention within the chest container. The man did not show any sign of fatigue, breathing impairment o marked blood pressure alteration.

This invention may be embodied in other forms or carried out in other ways without departing from the spirit of essential characteristics thereof. The present embodiment is therefore to be considered as in all respects illustrative and not restrictive. The scope of the invention being indicated by the appended claims, and all changes which come within the meaning and range of equivalency are intended to be embraced therein.

What is claimed:

1. A method for producing a reversible adsorbent having between about 2.0 and 3.0 molecules of modifying agent per square nanometer and displaying near infrared bands at 7220, 6720, 6557, 5970–5480, 5270, 4945 and 4545 cm$^{-1}$ for use in the removal of carbon dioxide comprising the steps of:
   providing a silica gel;
   providing a clay material;
   mixing said silica gel with said clay material to obtain a material containing between about 10 wt. % and about 30 wt. % of clay;

forming an extruded solid material from said silica gel-clay material; and treating said extruded solid material in a solution containing a surface modifying agent so as to modify chemically the surface of said extruded solid material and thereby form said reversible adsorbent for removing carbon dioxide.

2. A method according to claim 1 wherein said forming step comprises:

controlling the water content of said silica gel-clay material between about 35 wt. % and about 50 wt. % so as to obtain a desired level of plasticity;

passing said silica gel-clay material through an extruder to form a silica gel-clay extrudate; and drying said extrudate.

3. A method according to claim 2 wherein said drying step comprises drying said extrudate at a temperature between from about 27° C. to about 270° C. for a time period in the range of from about 1 hr. to about 4 hrs. so as to produce a material having a chemical composition containing from about 76 wt. % to about 92 wt. % $SiO_2$, from about 7 wt. % to about 20 wt. % $Al_2O_3$, from about 0.6 wt. % to about 2.0 wt. % $Fe_2O_3$ and the balance essentially impurities.

4. A method according to claim 1 wherein said treating step comprises treating said extruded solid material in said solution at a temperature between about 50° C. to about 150° C. for between about 4.5 hours to about 30 hours.

5. A method according to claim 1 further comprising:

triturating and milling said silica gel to a particle size between about 40 mesh and about 200 mesh prior to said mixing step; and triturating and milling said clay to a particle size between about 20 mesh and about 400 mesh.

6. A method according to claim 1 wherein said silica gel providing step comprises providing a silica gel having a composition based on total dry weight which consists essentially of from about 96.0 to about 99.7 wt. % $SiO_2$, from about 0.05 to about 0.15 wt. % $Al_2O_3$, from about 0.01 to about 0.03 wt. % $TiO_2$, from about 0.005 to about 0.015 wt. % $Fe_2O_3$, from about 0.06 to about 0.08 wt. % CaO, from about 0.05 to about 0.07 wt. % $Na_2O$; from about 0.02 to about 0.04 wt. % $ZrO_2$ and from about 0.02 to 0.04 wt. % trace elements.

7. A method according to claim 1 wherein said clay providing step comprises providing a natural clay having a composition based on total dry weight which consists essentially of from about 3.0 to about 10.0 wt. % $Fe_2O_3$, from about 40 to about 75 wt. % $SiO_2$, from about 10 to about 25 wt. % $Al_2O_3$, from about 0.1 to about 0.8 wt. % MgO, from about 0.3 to about 2.6 wt. % $K_2O$ and from about 0.1 to about 1.5 wt. % $Na_2O$.

8. A method according to claim 1 further comprising:

washing said surface modified material with at least one solvent at a temperature between about 25° C. to about 100° C. for a time period between about 0.3 hours to about 3.0 hours; and drying said surface modified material in a continuous flow of nitrogen at a temperature of about 50° C. to about 80° C. for between about 20 to about 48 hours.

9. A method according to claim 4 further comprising:

agitating said extruded solid material in said solution at an agitation velocity between about 60 to about 200 rpm. during said treating step.

10. A method according to claim 9 wherein said agitating step comprises stirring said extruded material in said solution by bubbling pure deoxygenated nitrogen at a volume space velocity of between about 0.18 to about 0.80 $h^{-1}$.

11. A method according to claim 4 wherein:

said treating step further comprises treating said extruded material in a solution containing a modifying silane agent present in a concentration between about 5 vol. % and about 75 vol %.

12. A method according to claim 11 wherein said modifying silane agent is an aminoalkoxysilane.

13. A method according to claim 12 wherein said aminopolyalkoxysilane is selected from the group consisting of 3-aminopropyltriethoxysilane, N-2-Aminoethyl-3 aminopropyltrimethoxysilane and N-Methyl-3 aminopropyltrimethoxysilane.

14. A method according to claim 11 wherein the concentration of said silane modifying reagent ranged between about 13 and about 38 vol. %.

15. A method according to claim 8 wherein said washing step comprises washing said surface modified material with between about 1 to about 5 liters of said at least one solvent per kilogram.

16. A method according to claim 8 wherein said at least one solvent in said washing step is selected from the group consisting of liquid alkanes and aromatic hydrocarbons.

17. A method according to claim 16 wherein said liquid alkane is selected from the group consisting of n-pentane, n-hexane, n-heptane and mixtures thereof.

18. A method according to claim 16 wherein said aromatic hydrocarbon is selected from the group consisting of benzene, toluene, o-,m-,p-xylene and mixtures thereof.

19. A method according to claim 1 wherein:

said silica gel providing step comprises providing a silica gel having a particle size between about 60 and about 80 mesh; and said mixing step comprises mixing said silica gel with clay and obtaining a material containing between about 70 wt. % to about 90 wt. % silica gel.

20. A method according to claim 19 wherein said forming step comprises controlling the water content of said silica gel-clay material between about 42 wt. % and about 48 wt. %.

21. A method according to claim 20 further comprising:

drying said extruded material prior to said treating step at a temperature between about 27° C. to about 270° C. for a time period between about 1 hour to about 4 hours.

22. A method according to claim 20 further comprising:

drying said extruded material prior to said treating step at a temperature between about 100° C. to about 250° C. for a time period between about 2 to about 3 hours.

23. A method according to claim 22 wherein said treating step comprises agitating the mixture of said extruded solid material and said surface modifying reagent with an agitation velocity of from about 80 to about 120 rpm.

24. A method according to claim 23 wherein said agitating step comprises stirring said mixture with a flow of pure deoxygenated nitrogen at a volume space velocity in the range of from about 0.30 to about 0.50-$h^{-1}$.

25. A method according to claim 24 wherein said treating step comprises:

placing from about 5 to about 25 kilograms of said extruded material in a reactor;

adding between from about 1.2 to about 15.0 liters of said surface modifying reagent; and transferring between about 5 to about 25 liters of a solvent to said reactor.

26. A method according to claim 8 wherein said drying step comprises drying said surface modified material in a first stage using a flow of pure, deoxygenated nitrogen using a volume space velocity between about 0.2 $h^{-1}$ to about 0.3 $h^{-1}$ at a temperature between about 60° C. to about 70° C. for a time period between about 20 hours to about 48 hours.

27. A method according to claim 26 wherein said drying step further comprises drying said surface modified material in a second stage in vacuo at a pressure between about 0.1 and about 10 millimeters of Hg at a temperature between about 80° C. and about 140° C. for a time period between about 1 hour to about 6 hours.

28. A method according to claim 27 wherein said second stage drying step comprises drying said material in vacuo at between about 1.0 to about 5.0 millimeters of Hg at a temperature between about 100° C. to about 110° C. for a time period between about 1 hour to about 3 hours.

29. A reversible adsorbent for use in the removal of carbon dioxide from a gas, said adsorbent comprising a silica gel whose surface has been modified by an aminoalkoxysilane, said silica gel having a chemical composition consisting essentially of from about 70 to 80 wt. % $SiO_2$, from about 10 to about 15 wt. % $Al_2O_3$, from about 1.0 to 1.5 wt. % $Fe_2O_3$ from about 8 to about 12 wt. % organic residue and from about 0.5 to about 0.9 wt. % trace impurities.

30. An adsorbent according to claim 29 further comprising said silica gel having a surface modified by aminoorganic residues chemically bonded in an amount between about 0.50 and about 1.26 mmoles per gram as determined by C, N, H microanalysis and near infrared spectroscopy.

31. An adsorbent according to claim 30 wherein said surface is modified with from about 0.50 to about 1.26 mmoles of $-CH_2CH_2CH_2NH_2$ per gram of adsorbent.

32. An adsorbent according to claim 29 wherein said adsorbent shows near infrared bands at 7220, 6720, 6557, 5970–5480, 5270, 4945 and 4545 $cm^{-1}$.

33. An adsorbent according to claim 29 wherein said adsorbent has a surface area between about 120 and about 240 $m^2/g$ and a total pore volume between about 0.4 cc/g and about 0.8 cc/g where about 80% of the total pore volume contains pores having a diameter between about 60 Å and about 180 Å.

34. An adsorbent according to claim 29 wherein said modified surface has between about 2 and about 3 molecules of amino modifying agent per square nanometer.

35. An adsorbent according to claim 29 wherein said adsorbent has a heat of adsorption of carbon dioxide between about 7 and about 17 Kcal/mol.

36. An adsorbent according to claim 29 wherein the carbon dioxide adsorption process yields a carbamate surface moiety when the carbon dioxide is dry and a bicarbonate surface species when the carbon dioxide is humid.

37. An adsorbent according to claim 29 wherein said adsorbent adsorbs between about 7.5 and about 11.7 cc of dry $CO_2$ per gram.

38. An adsorbent according to claim 29 wherein said adsorbent is regenerable at a temperature between about 70° C. and about 150° C. without losing substantially any adsorptive capacity.

39. A method for producing a reversible adsorbent for use in the removal of carbon dioxide comprising the steps of:

mixing a material containing silica with a filler material so as to obtain a material containing between about 10 wt. % and about 30 wt. % of said filler material;

adding water to said material in an amount sufficient to provide said material with a water content in the range of from about 35 wt. % to about 50 wt. %;

extruding said material to form an extrudate;

placing said extrudate in a reactor;

adding a mixture of a silane surface modifying reagent in a concentration between about 5 vol. % and about 75 vol. % and a solvent in a concentration between about 25 vol. % and 95 vol. % to said reactor;

agitating said extrudate and said mixture at a temperature between about 50° C. to about 150° C. for between about 4.5 hours to about 30 hours to form said reversible adsorbent for removing carbon dioxide;

washing said adsorbent in a solvent; and drying said absorbent.

* * * * *